United States Patent
Schmidt

(10) Patent No.: US 6,171,132 B1
(45) Date of Patent: Jan. 9, 2001

(54) COVER FOR CABLE CONNECTORS AND THE LIKE

(75) Inventor: Stephan John Schmidt, Maple Valley, WA (US)

(73) Assignee: C-K Worldwide Inc., Auburn, WA (US)

( * ) Notice: Under 35 U.S.C. 154(b), the term of this patent shall be extended for 0 days.

(21) Appl. No.: 09/589,857

(22) Filed: Jun. 8, 2000

(51) Int. Cl.$^7$ .................................................. H01R 13/62
(52) U.S. Cl. .......................................... 439/369; 439/367
(58) Field of Search .................................. 439/368, 369, 439/367, 370, 371

(56) References Cited

U.S. PATENT DOCUMENTS

| | | | |
|---|---|---|---|
| 3,014,194 | * 12/1961 | Berglund | 439/369 |
| 3,030,601 | 4/1962 | Krebs | 339/75 |
| 3,344,393 | * 9/1967 | Hendee | 439/369 |
| 4,169,643 | * 10/1979 | Gallagher | 439/369 |
| 4,643,505 | 2/1987 | House et al. | 339/75 P |
| 5,129,839 | * 7/1992 | VanSkiver | 439/369 |
| 5,135,409 | * 8/1992 | Thompson | 439/369 |
| 5,139,429 | * 8/1992 | Herman et al. | 439/368 |
| 5,259,782 | 11/1993 | Giffin | 439/367 |
| 5,266,740 | 11/1993 | Hsu | 174/72 C |
| 5,755,588 | 5/1998 | Sweatman et al. | 439/369 |
| 5,853,200 | 12/1998 | Zieres | 285/45 |
| 5,895,076 | 4/1999 | Elliott | 285/14 |
| 5,913,682 | 6/1999 | Targett | 439/369 |

FOREIGN PATENT DOCUMENTS 0 257 896    2/1988    (EP) .

* cited by examiner

*Primary Examiner*—Paula Bradley
*Assistant Examiner*—Tho D. Ta
(74) *Attorney, Agent, or Firm*—Keith D. Gehr

(57) ABSTRACT

A readily installed or removed cover for boot for a connection in an electrical cable or fluid line is described. The boot consists of a body portion divided longitudinally into two sections for easy application. The body has a threaded cylindrical proximal end, a middle section, and a generally frustroconical distal end. The proximal end and middle sections are split by a plane preferably located to include the longitudinal axis of the boot. Just before the distal end the plane makes a sharp upward jog to form a shoulder. A slot through the upper part of the distal end completes separation of the two sections. In cross section this slot occupies about 60° of the distal end circumference. The lower section contains the major part of the distal end while the upper section has a tongue corresponding to the slot in the lower section. The edges of the tongue have outwardly extending ridges that fit into corresponding grooves in the lower section to lock the two together when assembled. A nut at the threaded proximal end completes the unit.

10 Claims, 3 Drawing Sheets

COVER FOR CABLE CONNECTORS AND THE LIKE

The present invention is directed to a boot or cover for electrical or fluid line connectors. The cover can provide electrical insulation and may be readily applied and removed.

BACKGROUND OF THE INVENTION

Covers or boots for electrical or fluid line connectors are in common use. They serve a number of functions that may or may not be performed simultaneously. Foremost among these functions, at least for electrical connectors, is to provide insulation around exposed metallic conductive surfaces. However, they may also serve to maintain the integrity of connections subject to tension and/or prevent snagging when a cable or hose must be pulled across a surface and around obstructions.

The simplest type of boot is one that is a plain molded cover having a hole at one end the diameter of the wire or cable and an enlarged portion at the other end to cover the connector. This is placed at a free end of the cable and drawn along its length to the point of need. This type of cover has the limitation that, once in place, it is inconvenient to remove or replace. Recognizing this limitation, inventors have designed unitary or multiple piece covers that maybe more readily applied and removed. Many of these are clamshell types, hinged along one edge with some means for securing the two halves along the opposite edge when in place. A variation uses two piece covers that are then secured along both edges by screws, retainer rings, or some other means.

Zieres, in U.S. Pat. No. 5,853,200, shows two versions of a boot covering a hose connection. One is an example of the simple slide-on type. The other is a clamshell version having two latching clips to hold it in place. Other clamshell types are shown in U.S. Pat. No. 3,030,601 to Krebs; U.S. Pat. No. 4,643,505 to House et al.; U.S. Pat. No. 5,755,588 to Sweatman et al.; and U.S. Pat. No. 5,913,692 to Targett. The Krebs patent shows a connector cover in which the two portions are held together by internal springs and simply pried apart to enable insertion of male and female sections of electrical extension cords. The other three patents are all variations of the theme of the Zieres example that uses snap together latches to secure the two halves in place.

Elliott, in U.S. Pat No. 5,895,076, is an example of the two piece variety in which the separate halves are held together by screws after placement over the connection. A similar connector is shown in European Patent 0 257 896. Giffin, in U.S. Pat. No. 5,259,782, shows a somewhat more complex four piece connector for extension cords. Each end of the cable has a two piece snap-together cover forming separate halves. In turn, the two halves may then be united when the male and female plugs are assembled. The latching portions may be disassembled by inserting a pin into appropriate holes provided for this purpose.

Hsu, in U.S. Pat No. 5,266,740, shows a more complex clamshell type having a side opening for a coaxial cable T-connection. After the hinged halves are closed a pair of rings, previously slipped over each end of the main run of cable, are then pushed into place over each end of the clamshell portion to serve as retainers.

The present invention is an improved cable boot that overcomes many of the deficiencies present in known products and one that is easy to install or remove without tools yet which readily permits side access for auxiliary cables.

SUMMARY OF THE INVENTION

The boot or cable cover of the present invention comprises a shell-like body having an internal cavity and having proximal and distal ends and a middle portion. The proximal end is cylindrical in cross section and externally threaded while the distal end is preferably frustroconical in configuration. The middle portion is typically enlarged relative to the proximal end and may be of circular or asymmetric cross section.

The body is divided longitudinally along each side into first and second sections that may be readily placed around an electrical or fluid line connection. Where the term "cable" is used it should be considered broadly to either include electrical or fluid carrying lines. The lines of division or separation of the sections lie on a plane passing through the proximal end and substantially through the middle portion of the body. Preferably the longitudinal axis through the boot lies on this plane. When the lines of division reach the distal end they make an angular jog, preferably at about 90°. The lines of division continue through the distal end forming a slot through the superior portion of the distal end. A step is thus created immediately anterior to the distal end. The first section retains a major portion of the distal end while the distal end of the second section is formed as a tongue-like strip. The tongue-like strip of the second section mates into the slot of the first section. The edges formed on the tongue-like strip lie generally at a 90° angle to those formed on the proximal and middle sections.

The longitudinal edges of the tongue-like strip additionally have narrow outwardly extending ridges or flanges which slip into corresponding grooves in the slot formed in the first section. When the two sections are mated, the ridges lock the sections together at the distal end. An internally threaded nut or retainer sized to fit the threads of the proximal end serves to secure that portion of the assembled sections. The opening in the nut is of sufficient size so that it can be slipped over one of the cables.

While the boot may be used along a run of cable it is also useful at a terminal end where a cable joins an appliance or junction box. An example of the latter situation might be where the cable joins a welding unit.

The boot may have apertures in the middle sections to admit one or more cables entering from the side.

The body of the boot is preferably molded in two pieces of a rigid plastic or flexible resilient material. The nut uniting the pieces is molded of a similar material.

It is an object of the invention to provide an improved boot or cover for junctions in electrical cables of fluid lines.

It is a further object to provide a boot or cover that may be readily installed or removed without tools.

It is another object to provide a boot or cover that may be applied directly at the point of need without having to be slipped along the length of the cable or fluid line.

These and many other objects will become readily apparent upon reading the following detailed description taken with the drawings.

DETAILED DESCRIPTION OF THE PREFERRED EMBODIMENTS

Figure 1:
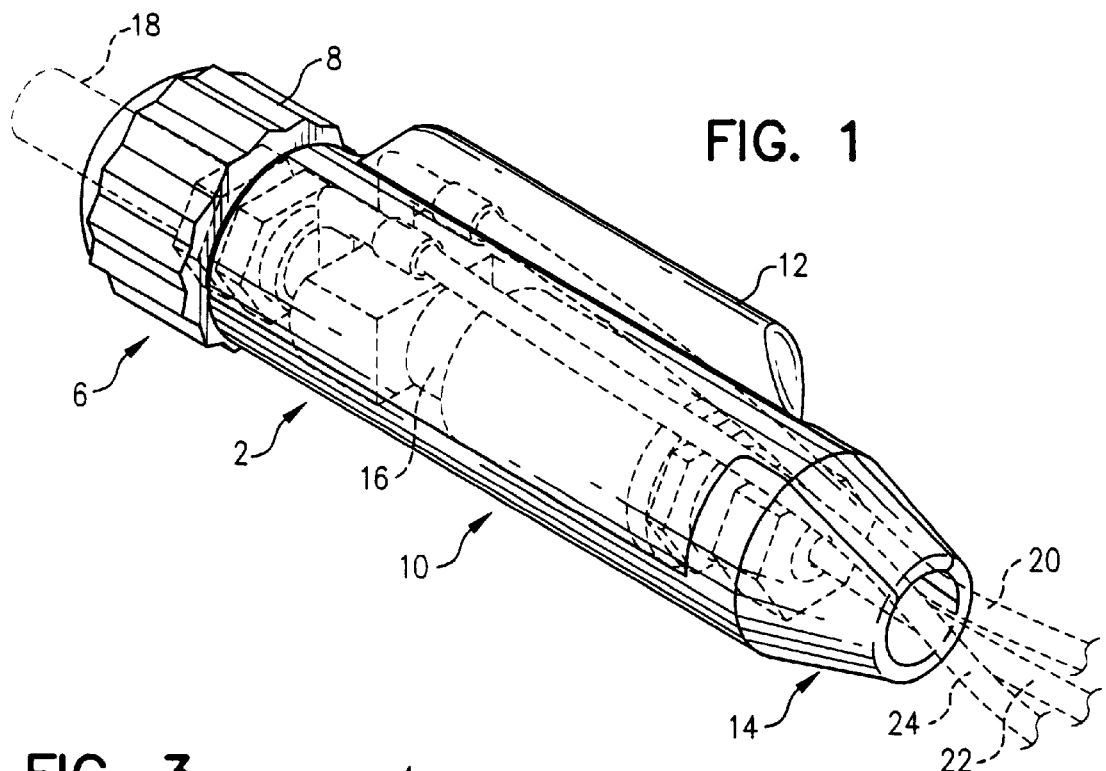
FIG. 1 is a perspective view of the boot with a power/water/inert gas adapter shown in phantom view.
Figure 3:
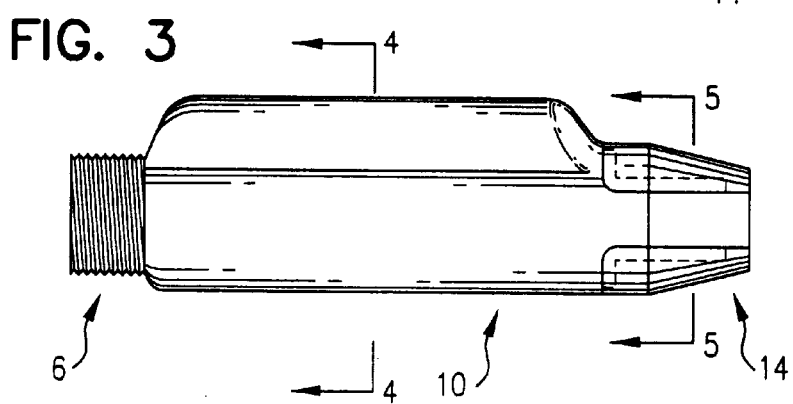
FIG. 3 is a side elevation view of the main body of the boot.

The assembled cover or boot with exemplary internal content is seen in FIG. 1. In the case illustrated the boot is used to insulate and protect an assembly used with tungsten inert gas welding equipment. The boot, generally seen at 2, has a shell-like body formed in two sections defining an internal cavity. It has a proximal end 6, locked together by a nut 8, a middle or central portion 10, and preferably a generally frustroconical distal end 14. It is within the scope of the invention for the distal end to be a continuation of the middle section cross section although this is not generally preferred. The middle portion of the boot illustrated is asymmetric in cross section and has an optional side portion 12 that may be included to accommodate a specific internal connector configuration. The body is divided into upper and lower sections 30, 32, best seen in FIG. 2. The terms upper and lower are used here for convenience of description and are not limiting in any manner to a required position while in use.

The illustration shown in FIG. 1 includes a power/water/inert gas adapter 16. This has a Dins-type connector 18 adapted to quickly plug into a welder unit. Inert gas for the torch is also supplied through this connector. Line 20 conveys the inert gas from the adapter to the torch. Line 22 conveys electrical power to the torch and also returns torch head internal cooling water back for recirculation. Line 24 supplies cooled water to the torch head. The adapter 16 is described here as exemplary of one illustration of the many uses of the boot. It does not form any part of the present invention.

Figure 2:
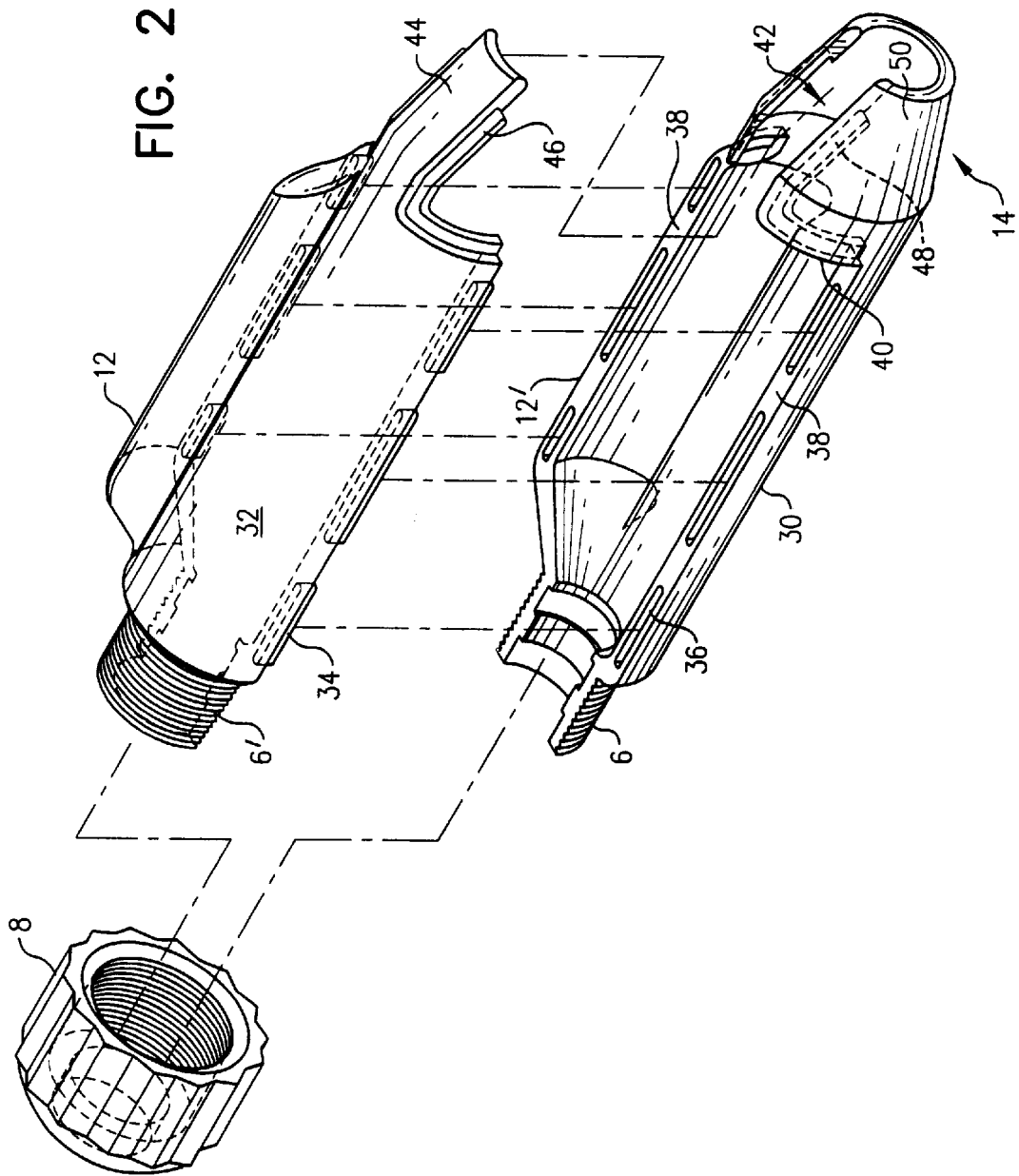
FIG. 2 is a perspective exploded view of the boot.

Referring now to FIG. 2, the boot is seen in exploded view with lower section 30 separated from upper section 32. Proximal end 6, 6' is threaded to accommodate nut 8. Upper section 32 has edge portions with a plurality of depending ridges 34 which mate with equivalent grooves 36 in the lower section. This ridge and groove arrangement is preferred for mechanical integrity but is not absolutely essential. The relative position of the ridges and grooves could also be reversed, if desired. The two sections are divided by a plane passing through the proximal and middle portions to form edges 38. For convenience of description this plane of division will be referred to as plane 38'. While plane 38' is preferably located so as to include the longitudinal axis of the boot, this is not essential and the plane may be displaced somewhat upwardly or downwardly. At or immediately anterior to distal end 14, the plane of division forms a sharp upward jog, preferably at about 90°, to form a step or shoulder 40. A slot 42 through the upper portion of the distal end completes separation of the two sections. This slot, which remains on the distal end of the lower body section, will encompass significantly less than 180° of the distal end cross section circumference, typically between 45°–90° and preferably about 60°. A tongue 44, mating with slot 42, remains on the distal end of the upper section of the body. Tongue 46 has outwardly extending ridges 46 which lock into equivalent grooves 48 on the lower body section when the unit is assembled. This assembly is accomplished by tilting the upper section slightly and sliding the tongue longitudinally into slot 42 in the lower section until locked in place. The nut 8 is then screwed onto threaded distal end 6 to form a solid unitary assembly of the boot.

Figure 4:
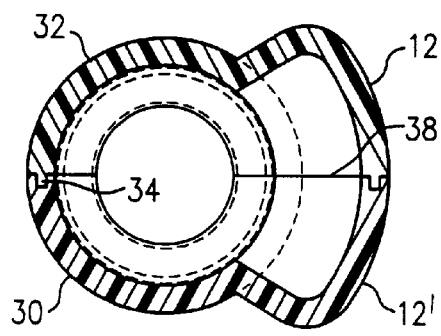
FIG. 4 is a cross section taken along line 4—4 of FIG. 3
Figure 5:
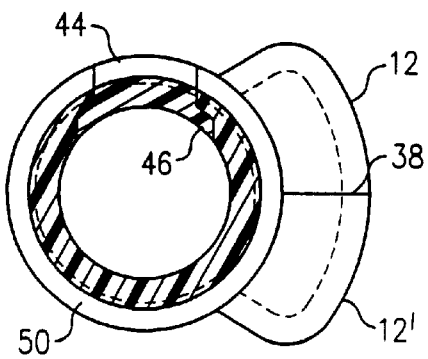
FIG. 5 is a cross section taken along line 5—5 of FIG. 3

FIG. 4 shows a cross sectional cut through the mid portion 10 of the assembled body and shows how the depending ridges 34 mate into corresponding grooves 36, not numbered in this figure. It should be noted that side portion 12, 12' need not be symmetrical about plane of division 38 and, in fact, this portion is not essential to the broader concept of the invention. Depending on the intended use, the body portion could be circular in cross section or of some other geometric configuration. FIG. 5 shows a cross section through the distal end of the body with tongue 44 assembled into lower portion 50.

Figure 6:
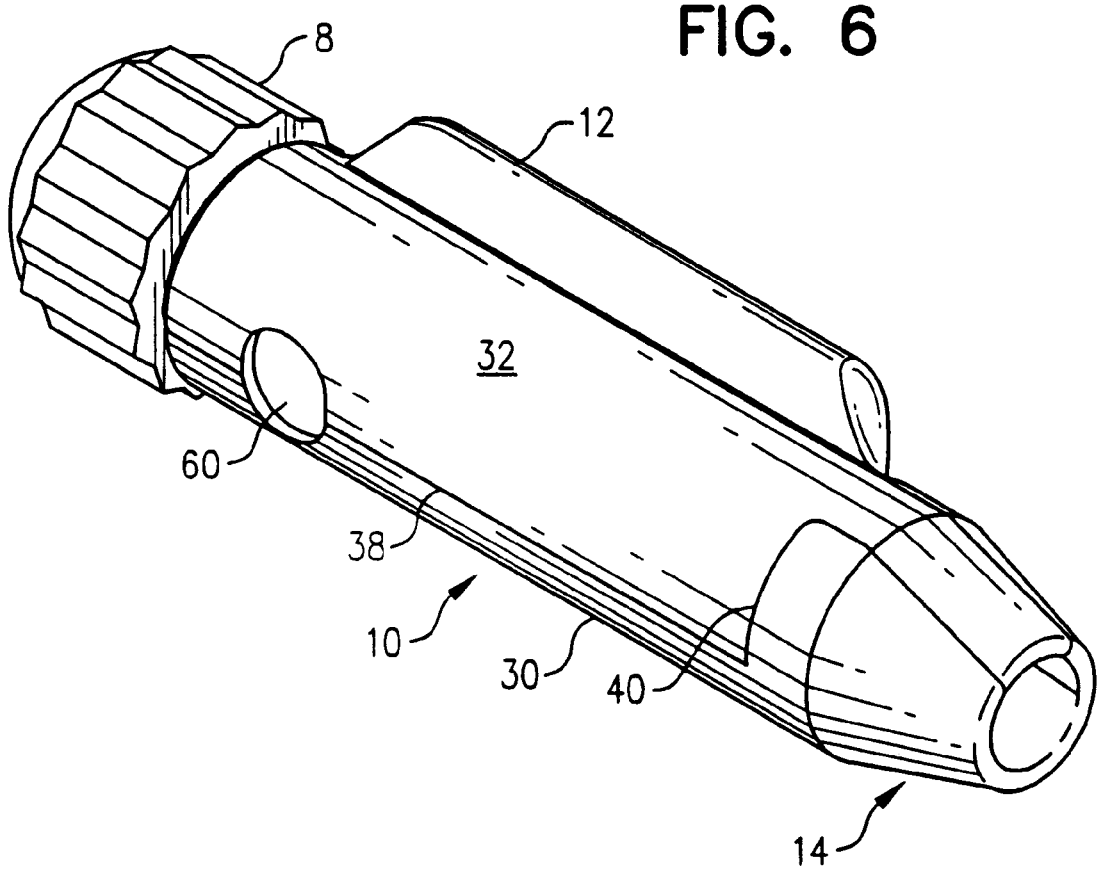
FIG. 6 is an alternative construction of the boot permitting side entry of a line or cable.

FIG. 6 is similar to FIG. 1 but shows one of the many possible variations that are considered to be within the broad scope of the invention. An additional opening 60 is formed in the middle portion to admit a fluid or electrical line coming in from the side of the boot.

The boot may be formed by conventional methods utilizing injection or compression molding and may be formed either of a softer resilient flexible material or a hard plastic composition. By being constructed in two halves, the boot may be quickly installed or removed without the necessity of sliding it along the full length of a cable. The opening in the nut is large enough so that it may be slipped over one cable section prior to installation on the main body of the boot.

The terms "proximal" and "distal" should be considered relative and have been used herein as descriptive devices rather than limiting terms.

Having thus described the best known mode of the invention, it will be readily apparent that many variations not described herein could be made without departing from the generic concept. These variations are considered by the inventors to be within the scope of the invention if encompassed within the following claims.

What is claimed is:

1. A cable cover or boot which comprises
   a shell-like body having proximal and distal ends and a middle portion, the body having an internal cavity for receiving an electrical or other connector, the proximal end being cylindrical and having external threads;
   the body being divided longitudinally into separate first and second sections, the line of division lying on a plane passing through the proximal end and middle portion of the body then taking an angular jog as it reaches the distal end to create a step or shoulder anterior to the distal end, the line of division continuing through the distal end as a slot, the first section containing a major part of the distal end and the second section containing a tongue-like strip mating into the slot in the first section,
   the tongue-like strip having longitudinal edges with narrow outwardly extending ridges, the ridges adapted to slip into corresponding grooves in the major part of the first section to essentially lock together the two sections at the distal end when the cover is assembled; and
   an internally threaded nut sized to fit the threads of the proximal end to tightly secure the two sections at the proximal end.

2. The boot of claim 1 in which the line of division follows a mid-line lying on a plane containing the longitudinal axis as it passes through the proximal end and middle portion.

3. The boot of claim 1 in which the distal end is generally frustroconical in configuration.

4. The boot of claim 1 in which the angular jog is about 90°.

5. The boot of claim 1 in which the middle portion is essentially circular in cross section.

6. The boot of claim 1 in which the middle portion is asymmetric in cross section.

7. The boot of claim 1 in which the middle portion is enlarged in cross section compared with the proximal end.

8. The boot of claim 1 having at least one aperture in the middle portion to permit entry of side cables.

9. The boot of claim 1 constructed of a resilient flexible material.

10. The boot of claim 1 constructed of a hard molded plastic material.

\* \* \* \* \*